United States Patent [19]

Obersby et al.

[11] 4,044,936
[45] Aug. 30, 1977

[54] GLASS TUBE CUTTING

[75] Inventors: Derek Obersby, Great Hayward, near Stafford; Thomas Kenneth Allen, Abingdon, both of England

[73] Assignee: James A. Jobling & Company Limited, Sunderland, England

[21] Appl. No.: 577,083

[22] Filed: May 13, 1975

[30] Foreign Application Priority Data

May 21, 1974 United Kingdom ............... 22588/74

[51] Int. Cl.² .......................... B26F 3/14; C03B 33/06
[52] U.S. Cl. .................................. 225/2; 219/121 L;
219/121 LM; 225/93.5
[58] Field of Search .................. 225/1, 2, 93.5, 94, 225/96; 65/174, 176; 219/121 L, 121 M

[56] References Cited

U.S. PATENT DOCUMENTS

| 3,157,328 | 11/1964 | Hennings et al. ............... 225/93.5 X |
| 3,406,886 | 10/1968 | Wessel et al. .................... 225/93.5 X |
| 3,543,979 | 12/1970 | Grove et al. ...................... 219/121 L |
| 3,597,578 | 8/1971 | Sullivan et al. ............... 219/121 LM |
| 3,755,646 | 8/1973 | Muller ........................... 219/121 LM |
| 3,772,496 | 11/1973 | Harendza-Harinzma .... 219/121 LM |

Primary Examiner—Frank T. Yost
Attorney, Agent, or Firm—Burns, Doane, Swecker & Mathis

[57] ABSTRACT

Apparatus for cutting glass tubing transverse to its length comprises a laser, an optical system for directing the laser along a full circumferential line around the tubing without rotating the tubing and means for forming a point of weakness on the circumferential line so that the stress generated by the laser beam causes the tube to be cut. The optical system includes a mirror located within a tubular casing arranged to be inserted within the glass tubing to be cut.

18 Claims, 7 Drawing Figures

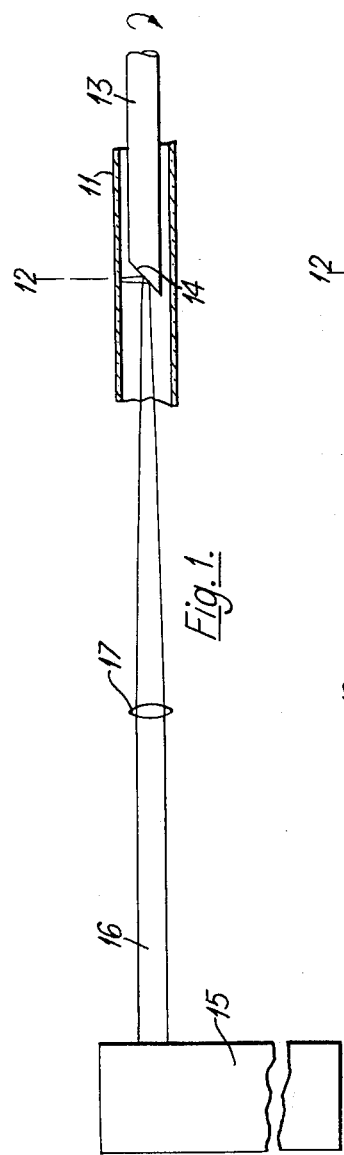
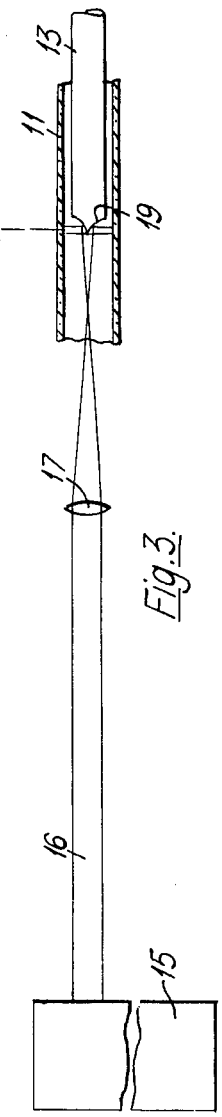

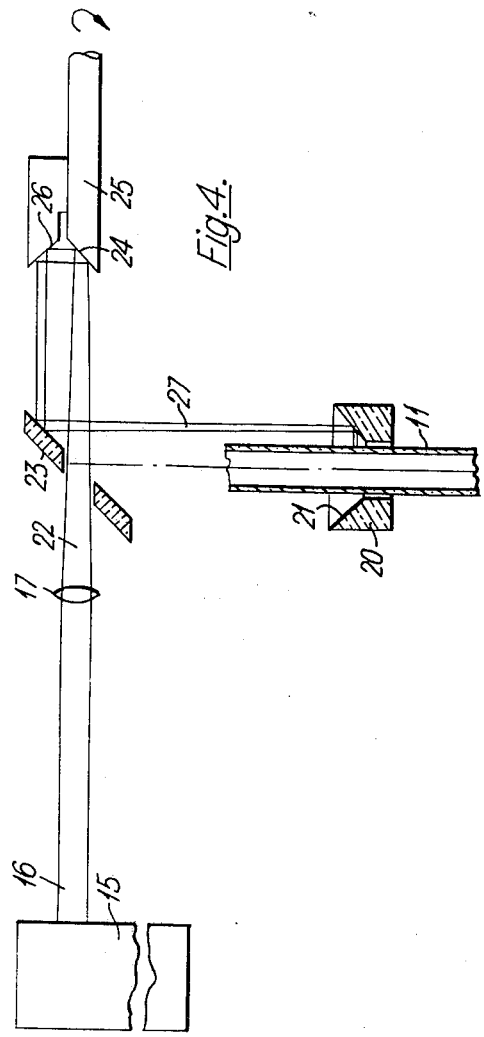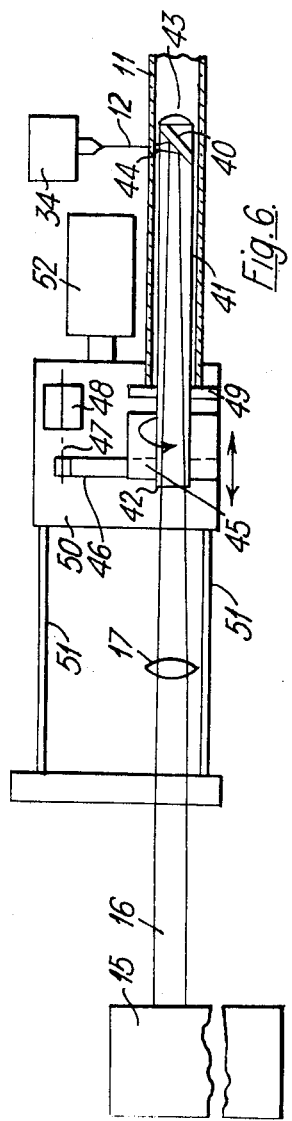

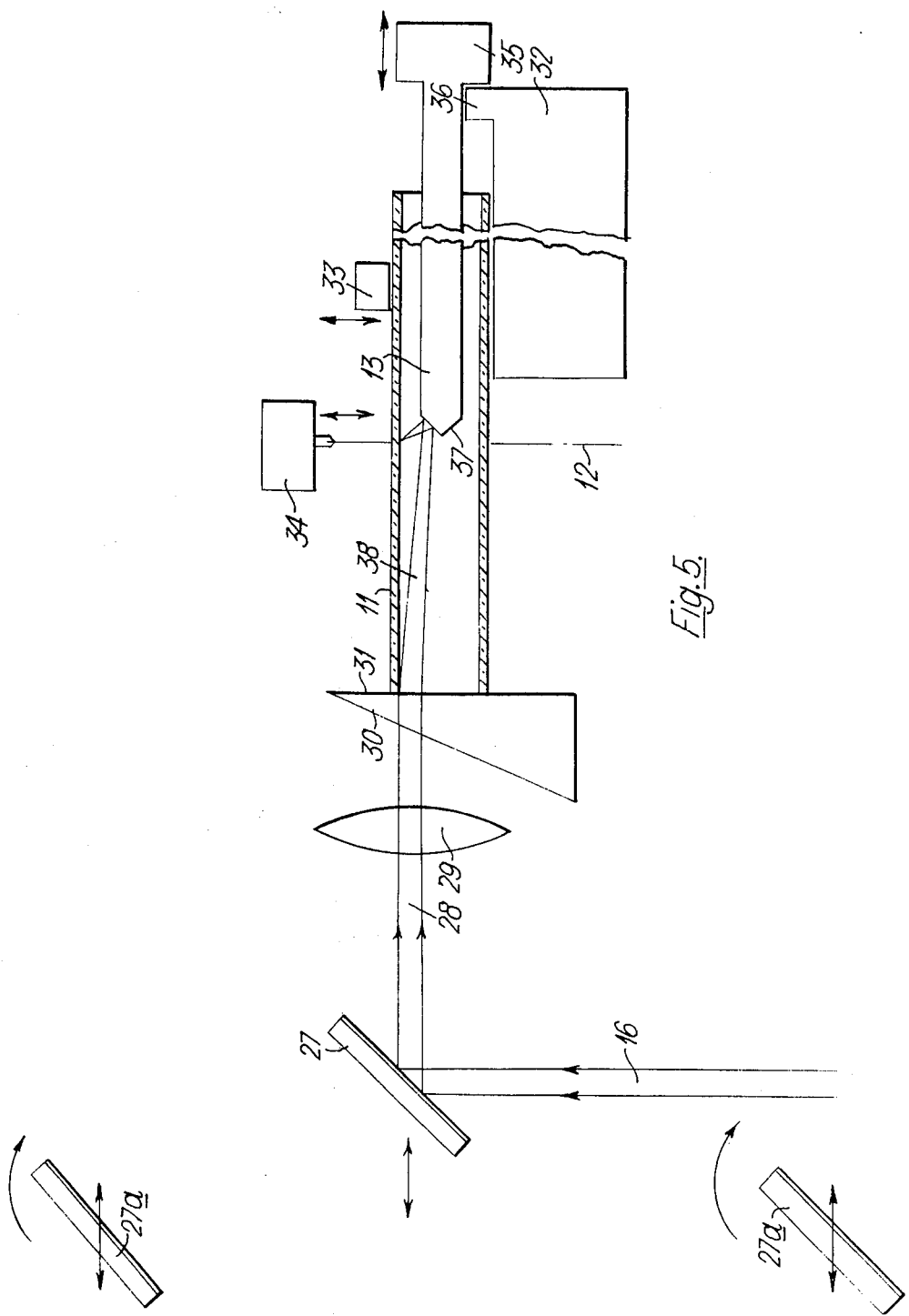

GLASS TUBE CUTTING

BACKGROUND OF THE INVENTION

The invention relates to cutting glass tubing.

In the production of glass tubing it is necessary to cut the tubing into required lengths, the cuts being made transverse to the length of the tubing. It has been normal practice to cut glass tubing by forming a score line at the required cutting position and then subjecting the tubing to a heated flame so as to crack the tube at the required position. To achieve satisfactory automatic operation, it is desirable to use a cutting technique which is both fast in operation and forms a reliable cut with considerable accuracy. Various proposals have previously been made for improving this cutting technique including the application of external chilling to the cutting region or wetting the score line. Furthermore, in order to achieve satisfactory cracking around the entire periphery is has normally been necessary to rotate the tube in order to apply the flame to all parts of the cutting line.

It is an object of the present invention to provide improved apparatus and methods for cutting glass tubing which enables reliable and accurate cuts to be formed at increased speeds.

SUMMARY OF THE INVENTION

The present invention provides a method of cutting glass tubing transverse to its length, which method comprises forming a point of weakness on the surface of the tube at the required cutting position, and directing a laser beam at the tube so that the beam is incident on a full circumferential line around the tube passing through the point of weakness without rotating the tube, the power of the laser beam being controlled such that sufficient stress is created in the glass to cause a fracture to run around the circumferential line passing through the point of weakness.

It will be appreciated that the energy from the laser beam is absorbed by the glass tubing thereby generating thermal stress causing the fracture to run from the point of weakness. The beam is preferably focussed onto the surface of the tube.

Preferably the point of weakness is formed in the exterior of the tube. The point of weakness may conveniently be a score mark.

Preferably the laser beam is incident on the internal surface of the tube. By the use of internal heating, the axial tensile stress at the outer surface of the tube caused by the overall temperature rise is increased by the stress due to the radial temperature gradient. This enables rapid and accurate cutting without the use of external chilling or wetting of the cutting line.

The use of a laser beam is advantageous in avoiding the need to rotate the tube. In one arrangement the laser beam is caused to scan around the circumferential line by means of an optical scanning system arranged to rotate an incident spot of radiation around the circumference of the tube. In an alternative arrangement the laser beam is directed at all parts of the circumferential line simultaneously.

By use of the aforesaid method, laser beams of the order of 100 watts can be used to cut glass tubing having for example an outside diameter of 20 mm. at a rate which enables 2,400 to 3,600 cuts per hour. Higher laser powers reduce the cutting time.

The invention also provides apparatus for cutting glass tubing transverse to its length, which apparatus comprises support means for a length of tubing to be cut, a laser source for emitting a laser beam of a wave length which is absorbed by the glass, and an optical system for directing the laser beam towards a circumferential line around the tubing at a required cutting position when the tubing is held by the support, the optical system being arranged to direct the beam around the full circumferential line without rotating the tube, whereby stress may be generated around the circumference to cause a fracture to run around the tube from a point of weakness formed in the tube on the cutting line. The cutting apparatus may include means for forming a point of weakness in the external surface of the tube at the required cutting position.

Preferably the optical system is arranged to direct the laser beam at the internal surface of the tube.

In one arrangement the optical system includes a reflecting device for directing the laser beam onto the tube surface, the reflecting device being at least part conical and arranged to direct the beam onto the full circumferential cutting line simultaneously. In an alternative, the reflecting device is arranged to direct the beam onto only part of the cutting line at one time, means being provided to rotate the reflecting device and thereby cause the beam to scan around the full circumferential line.

Preferably the optical system is arranged to direct the laser beam axially along the interior of the tube and a reflecting device is arranged to be located internally within the tube, and reflect the beam radially outwardly towards the circumferential cutting line.

In one embodiment the reflecting device is a conical mirror and the laser beam is directed at the tip of the cone. In an alternative arrangement the optical system includes means for directing an annular laser beam towards the reflecting device.

In a preferred arrangement, the reflecting device comprises a mirror located with a tubular casing acting as a mirror holder, the mirror being inclined to the axis of the casing and at least part of the casing adjacent the mirror being transparent to the radiation, whereby the casing may be inserted axially within the tube to be cut and rotated when the laser beam is directed axially along the casing onto the mirror so that the reflected beam scans around the internal surface of the tube.

The mirror may comprise a polished surface within the tubular casing. The casing may be provided with an aperture adjacent the mirror for transmitting the reflecting laser beam towards the internal surface of the tube. Conveniently the laser is a carbon dioxide laser.

BRIEF DESCRIPTION OF THE DRAWINGS

FIG. 1 shows schematically one embodiment of the invention,

FIG. 2 shows an alternative embodiment,

FIG. 3 shows a further alternative embodiment,

FIG. 4 shows a further alternative embodiment,

FIG. 5 shows a further alternative embodiment,

FIG. 6 shows a further alternative embodiment, and

DESCRIPTION OF THE PREFERRED EMBODIMENTS

Figure 7:
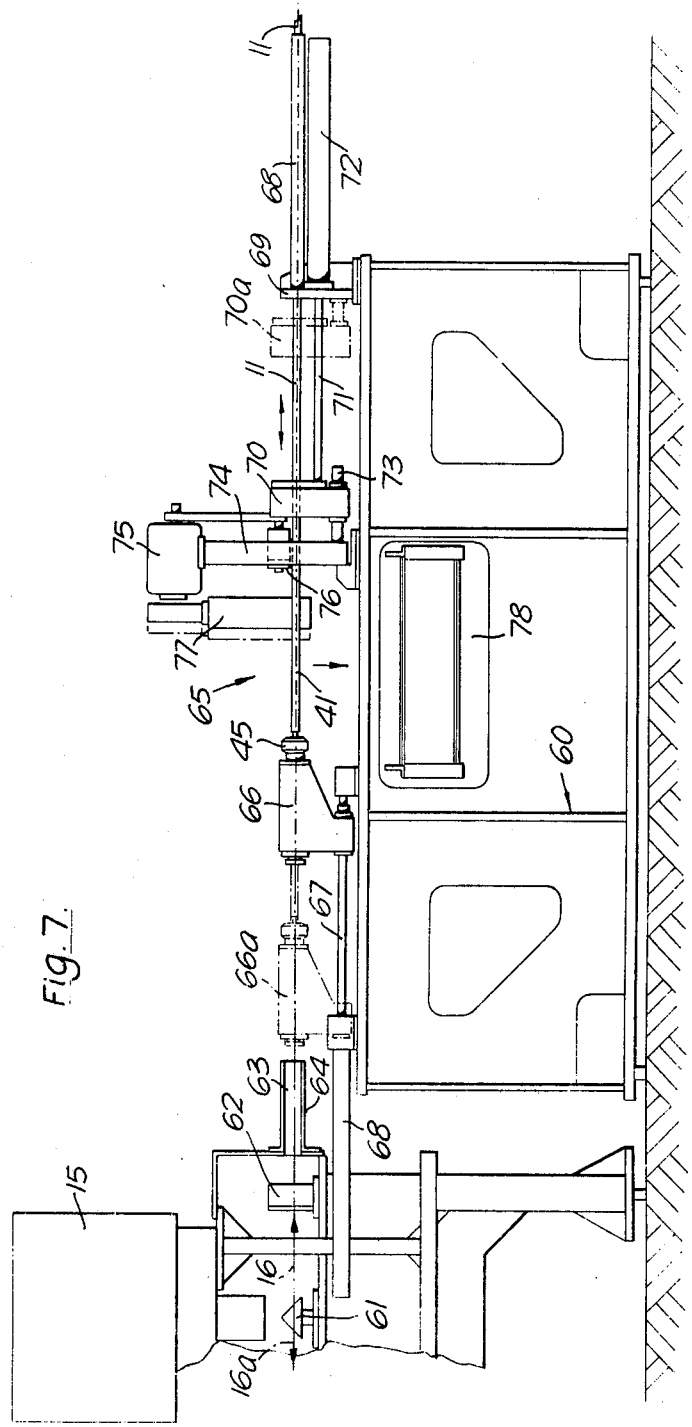
FIG. 7 shows a preferred embodiment generally similar to that of FIG. 6.

In the arrangement shown in FIG. 1, a glass tube 11 formed of Pyrex (Registered Trade Mark) is to be cut transverse to its length at a cutting position marked 12. The tube 11 is supported horizontally and a rotary rod 13 extends axially along the centre of the tube and is connected to a motor (not shown) for rotating the rod. The end of the rod carries a plane mirror 14 arranged at 45° to the axis of the tube. A score line is formed on the exterior of the tube at the cutting line 12. The score line may be formed by scratching with a knife or a diamond wheel or similar device and the score extends only a short length along the circumferential cutting path. In some applications it may be desirable for the score to extend through 360° around the tube. A laser 15 is arranged to direct an expanded uniphase beam 16 through a converging lens 17 towards the mirror 14. The beam converges towards the mirror so that the reflected beam leaving the mirror 14 is of narrow width. The reflected beam passes radially outwards and is incident on the internal surface of the tube 11 in alignment with the circumferential cutting line 12. The rod 13 is rotated so that the laser beam which impinges on only a short part of the circumferential cutting path at any one time, scans around the entire cutting line and thereby generates sufficient thermal stress within the tube to cause a fracture to run from the score line and extend around the entire circumferential cutting line. In this particular example the laser comprises a carbon dioxide laser arranged to emit radiation at a wave length of $10.6\mu$. The mirror is rotated at 2,000 rpm. and the laser beam is focussed on the inner surface of the tube in the form of a spot having a diameter of 2 millimeters.

The arrangement shown in FIG. 2 has similarities with that shown in FIG. 1 and like parts have been given the same reference numerals. In this case the laser beam 16 is passed through an annular beam shaper 18 so that an annular beam passes through the lens 17 towards the end of the rod 13. In this example the rod 13 has a conical mirror tip 19 facing towards the lens 17. In this way, the rod 13 is held stationary and the laser beam is directed outwardly from the tip 19 in all directions simultaneously. The laser beam thereby is focussed on the entire circumferential cutting path simultaneously. As can be seen from FIG. 2, the annular beam 20 leaving the lens 17 is incident symmetrically on the conical mirror 19 and no part of the beam is incident on the extreme tip of the cone. As in FIG. 1, the rod 13 is symmetrically placed along the axis of the tube 11. The reflecting end of the rod 13 is formed by cutting a concave circular profile into the sides of the cone so that in section the mirror provides a cusp. The power from the laser is controlled so that sufficient thermal stress is induced in the glass tubing to cause the fracture to run around the entire circumferential cutting path from the point of weakness, as was the case in the arrangement of FIG. 1.

A further alternative embodiment in which the laser beam is directed simultaneously at the entire circumferential cutting path is shown in FIG. 3. Again components similar to those previously described have the same reference numerals. In this case, the laser beam leaving the lens 17 is a solid beam of circular cross-section arranged to be incident on the tip of the conical mirror 19. The mirror has a sharper tip than that used in FIG. 3 and is again of concave form. This embodiment requires a higher quality conical mirror as the tip of the cone must not scatter a significant fraction of the beam. The operation of this example is substantially the same as that already described with reference to FIG. 2.

In all the above described examples the score mark is formed externally and the heating by the laser beam is applied internally. This has been found advantageous in effecting a good cut in that with internal heating the axial tensile stress at the outer surface of the tube caused by the overall temperature rise is increased by the stress due to the radial temperature gradient. This forms more efficient cracking around the cutting line.

It is however possible in some cases to achieve cutting of glass tubing by application of a laser beam to the external surface of the glass tubing and such an arrangement is shown in FIG. 4. In this case the tube 11 is arranged vertically and is surrounded by an annular conical mirror 20 having an annular reflecting surface 21 arranged at 45° to the axis of the tube. The laser 15 emits a beam 16 through the lens 17. The converging beam 22 passes through a central aperture in a plane mirror 23 arranged at 45° to the axis of the beam 22. The beam 22 impinges on a plane mirror 24 mounted on one end of a rotating rod 25. The rod 25 carries a further mirror 26 displaced from the axis of rotation of the rod 25. The two mirrors 24 and 25 are both inclined at 45° to the axis of the rod 25 and face each other. The laser beam incident on the mirror 24 is reflected onto the mirror 26 and back towards the plane mirror 23. Rotation of the rod 25 causes the radiation incident on the mirror 23 to describe an annular path surrounding the axis of the beam 22. The mirror 23 is aligned with the conical mirror 20 surrounding the tube 11 so that the laser beam 27 reaching the conical mirror 20 scans progressively around the annular reflecting surface 21. The beam is reflected by the mirror 21 onto the external surface of the tube 11 and scans around the circumferential cutting path which includes the external score mark. As in the previous examples the laser beam is controlled so that sufficient thermal stress is generated in the glass tubing to cause the fracture to run around the circumferential cutting path. It will be appreciated that one or more scratches or points of weakness of various lengths can be formed in the exterior of the tube and the score may if necessary be made to extend 360° around the tube. In general the external application of heat is less efficient than internal heating in causing good cutting of glass tubing. In some cases the crack may not occur until the glass begins to cool after application of the laser beam.

As already indicated, it is preferred to use internal heating and a further embodiment for putting this into effect is shown in FIG. 5. In this particular case a laser beam 16 leaving a laser such as that previously described is incident on a plane mirror 26 arranged at 45° to the path of the beam 16. The reflected beam 28 passes through a converging mirror 29 onto a rotating wedge shaped prism 30. The prism has a flat face 31 arranged perpendicular to the axis of the tube 11 and the face 31 provides an end marker for locating the axial position of the tube 11. The tube 11 is held on a support 32 and held in position by a clamp 33, which is movable towards and away from the support 22 in order to hold the tube in position. A scoring device 34 is movable towards and away from the external surface of the tube adjacent the required cutting line 12 so as to form a short score mark on the exterior of the tube. A rod 13 extends axially and centrally along the interior of the tube and is provided with a stop member 35 at one end which engages an upstanding lug 36 on the support 32 when the rod 13 is located accurately in position within the tube. The rod 13 has a conical reflecting end 37. In use, the prism 30 is rotated about an axis of rotation coincident with the axis of the tube 11 so that the beam 38 leaving the prism passes along the interior of the tube off the axis of the tube and impinges on one conical face of the mirror 37. This reflects the beam to form a sharply focussed spot at one point of the circumferential cutting path of the tube. As the prism 30 rotates, the beam 38 scans around the axis of the tube 11 and passes progressively around the reflecting face of the conical tip 37. This causes the reflected laser beam to scan around the entire circumferential cutting path on the tube 11 and thereby cause the fracture to run around the entire circumferential cutting line including the point of weakness.

In a practical embodiment of this device, three mirrors 27 are provided, two of which are marked 27a in FIG. 5. These mirors can be moved into and out of the path of the beam 16 as required so that for each laser beam 16 three (or more, by suitable provision of reflectors and/or shutters) different cutting stations may be provided and operated in sequence. The three mirrors 27 are moved into the path of the beam 16 in turn so as to carry out a cutting operation at its associated station and as soon as the laser beam has scanned the tube, the associated mirror 27 is withdrawn to permit the operation to be repeated for a different cutting station. In order to achieve maximum output from one laser, four beams 16 may be provided from each laser by use of beam splitters and three cutting stations provided for each of the beam paths so that a total of 12 cutting stations are provided for each laser. This permits increased speed of cutting operations.

One preferred arrangement using internal heating is shown in FIG. 6. Parts similar to those of the previous examples have been marked with the same reference numerals. This example uses internal heating and the beam 16 emerging from the laser 15 is passed through the converging lens 17 onto a plane mirror 40 arranged at 45° to the axis of the glass tube 11 and arranged to reflect the beam of radiation onto the internal surface of the tube 11 adjacent the cutting line 12. The effect of the converging lens 17 is such that the radiation reflected by the mirror 40 forms a spot on the internal surface of the tube 11. The mirror 40 is mounted in a tubular mirror holder 41. The holder has an open end 42 and a end 43. The mirror is located adjacent the closed end and part of the wall of the mirror holder 41 adjacent the mirror 40 is transparent. This may be in the form of an opening 44 through which the reflected beam may pass towards the tube 11. The tubular casing 41 is of slightly smaller diameter than the internal diameter of the tube 11 so that the casing 41 may be slid into position with slight clearance from the tube 11, the casing 41 being accurately aligned longitudinally with the axis of the tube 11. The mirror 40 may be a polished aluminium mirror and may form a polished inclined end to the casing 41. The open end 42 of the casing 41 is gripped by a collet 45. The collet 45 is connected by a belt drive 46 to a spindle 47 rotated by an electric motor 48. In this way, the collet 45 may be rotated thereby rotating the casing 41 together with the mirror40. During this rotation, the reflected spot will be caused to scan around the internal surface of the tube 11 along the cutting line 12. As shown in FIG. 6, a scoring device 34 is provided to make an external score on the tube 11 adjacent the cutting line 12. The tube 11 is located in position by an end stop 49. The collet 45 together with motor 48 is mounted on a frame 50 which can be reciprocated along the axis of the tube 11. The frame 50 is slidable on two horizontal supports 51 and is movable by a drive device 52. In this way, the mirror holder 41 may be moved horizontally out of position after severing the tube 11 and reinserted in position when the next tube 11 is brought into position for cutting.

In this arrangement shown in FIG. 6 the mirror holder 41 may be made in more than one part. For instance, the closed end 43 may be formed separately and screwed into position. In this way, the mirror 40 may be formed on the separate end 43 or may be located in position when the end is unscrewed. The casing 41 may itself be formed of aluminium. The casing 41 is interchangeable so as to allow for different tube diameters that are to be cut.

FIG. 7 shows a preferred arrangement generally similar to that already described with reference to FIG. 6 and similar reference numerals have been used for similar parts. In this case the apparatus is mounted on a general framework 60 and comprises a laser 15 arranged to direct a laser beam towards a beam splitting device 61 thereby producing two oppositely directed laser beams 16 and 16a. The beam 16a is used for a second cutting station similar to that shown in FIG. 7 but not shown in the drawings. The beam 16 passes through an optical system including a mirror 62. In some cases the mirror 62 may be a plane mirror arranged at 45° to the laser path so as to direct the beam in the correct direction. In this case a converging lens (not shown) may be incorporated in the optical system. Alternatively the mirror 62 may itself be a gold plated converging mirror arranged so that the laser beam 63 leaving the mirror is convergent. The beam 63 passes through a protective shield 64 and is directed towards the cutting station 65. At the cutting station 65 a tubular mirror holder 41 is similar to that previously described with reference to FIG. 6 is mounted in a collet 45 rotated by a motor (not shown) secured to a retractable head 66. The head 66 is mounted on a piston rod 67 connected to a pneumatic cylinder 68 so that the head 66 may be retracted to the position 66a shown in broken lines. Glass tubing 11 is fed from the right hand side of FIG. 7 by a supply system (not shown) through a support tube 68 attached to a mounting plate 69. A travelling clamp 70 is mounted on a rod 71 connected to a pneumatic cylinder 72 so that the clamp 70 may be moved between the left hand position shown in full lines and the right hand position 70a shown in broken lines. The clamp carries a stop member 73 which abuts the mounting plate 69 when in the right hand position. A main tube clamp 74 is provided adjacent the cutting station and supports a motor 75 arranged to rotate a scoring wheel 76 located to provide the external score in the glass tubing at the required cutting position. An unloading clamp 77 is provided to the left of the main clamp 74 and is arranged to hold the glass tubing after it has been cut. A conveyor 78 is located below the cutting station so as to remove the cut tubing after it is released by the unloading clamp 77. In operation, the travelling clamp 70 is moved to the right hand position and arranged to grip the part of the tubing emerging from the mounting plate 69. The cylinder 72 is operated to move the travelling clamp to its left hand position thereby drawing the tubing forwards into the cutting station. The mirror holder 41 is also moved to the right hand position by operation of the cylinder 68 so that the mirror holder is positioned axially within the part of the tubing to be cut. The tubing is then gripped by the main clamp 74 and unloading clamp 77. The motor 75 is operated to drive the wheel 76 and form the score mark and then the laser is operated (by opening a shutter in the optical system) and effects cutting of the tube 11 adjacent the score mark. The cut portion of the tube remains held in the clamp 77 while the head 66 and mirror holder 41 is retracted to the left hand position. The travelling clamp 70 which has been released, is moved to the right hand position ready to grip and feed further tubing. The unloading clamp 77 is then released to drop the cut length of tubing onto the conveyor 78 and the main clamp 74 is released to allow the next step in the sequence of feeding further tubing into the cutting station. The construction and operation of the mirror holder 41 and its rotation during the cutting operation is the same as previously described with reference to FIG. 6. By arranging for one laser to direct light towards one or more beam splitters so that several cutting stations may be operated simultaneously, it is possible to cut tubing of different diameter or in to different lengths at the different stations.

The above described examples are particularly suitable for cutting Pyrex (Registered Trade Mark) glass tubing. The tubing may have an outside diameter of for example 10 to 40 mm. and a wall thickness of 1 to 2 mm. As an example, the following results were achieved with the arrangement shown in FIG. 3:-

| Outside tube Diameter in mm. | Wall thickness in mm. | Number of cuts per hour |
| --- | --- | --- |
| 39 | 2.0 | 600 |
| 24 | 1.0 | 3,000 |
| 18 | 1.5 | 3,600 |
| 19 | 1.0 | 3,000 |

Although the above results were achieved with a laser of 100 watts, higher laser energies may be used to increase speed of cutting. For example, laser energy of the order of 400 to 500 watts may be used and this is particularly appropriate where larger glass tubing is used. It is also possible, when desirable, to apply water to the cutting line on the tube to accelerate the crack off which occurs when the laser beam is applied.

It will be appreciated that the invention is not limited to the details of the examples given above. For example, instead of using the converging lens 17 in FIG. 6, it is possible, and may in some cases be desirable, to use a reflector arranged to give a converging laser beam. A suitable reflector is a gold plated converging mirror and this has the advantage of avoiding the need for water cooling which may in some cases be necessary when using converging lenses.

In all cases the cutting was achieved without the need to rotate the glass tubing.

We claim:

1. A method of cutting glass tubing transverse to its length, which method comprises:
    forming a point of weakness on a surface of the tube at a required cutting position;
    directing radiation at the tube so that sufficient stress is created in the glass to cause a fracture to run around a circumferential line passing through said point of weakness; and generating said radiation by causing a laser beam of a wave length which is absorbed by the glass to converge from a position outside the tube whereby the beam is focused onto the glass,
    directing the laser beam longitudinally along the tube, and
    deflecting the direction of the beam so that the beam is focused fully incident on said circumferential line around the tube passing through the point of weakness without rotating the tube.

2. A method according to claim 1 wherein the laser beam is incident on an external surface of the tube.

3. A method according to claim 1 wherein the point of weakness comprises a score mark formed on an external surface of the tube.

4. A method according to claim 3 wherein the laser beam is incident on an internal surface of the tube.

5. A method according to claim 1 wherein the laser beam is caused to scan around the circumferential line by means of an optical scanning system arranged to rotate an incident spot of radiation around the circumference of the tube.

6. A method according to claim 1 wherein the laser beam is directed at all parts of the circumferential line simultaneously.

7. Apparatus for cutting glass tubing transverse to its length, which apparatus comprises:
    support means for a length of tubing to be cut;
    a laser source for emitting a laser beam of a wavelength which is absorbed by the glass; and
    an optical system arranged to direct the laser beam around a full circumferential line at a required cutting position without rotating the tube when the tube is held by the support means;
    said optical system including
        beam converging means located outside the tube and arranged to focus the beam onto the glass, beam directing means for directing the beam longitudinally along the tube, and
        beam deflecting means for deflecting the beam so that the beam is focused fully incident on said circumferential line;
    whereby stress may be generated around the circumference to cause the fracture to run around the tube from a point of weakness formed in the tube on said circumferential line.

8. Apparatus according to claim 7 including means for forming a point of weakness in an external surface of the tube at the required cutting position.

9. Apparatus according to claim 8 wherein the optical system is arranged to direct the laser beam at an internal surface of the tube.

10. Apparatus according to claim 9 wherein the optical system includes a reflecting device for directing the laser beam onto the tube surface, the reflecting device being at least part conical and arranged to direct the beam onto the full circumferential cutting line simultaneously.

11. Apparatus according to claim 9 wherein the reflecting device is arranged to direct the beam onto only part of the cutting line at one time, means provided to rotate the reflecting device and thereby cause the beam to scan around the full circumferential line.

12. Apparatus according to claim 7 wherein the optical system is arranged to direct the laser beam axially and internally along the tube and a reflecting device is arranged to be located internally within the tube, and reflect the beam radially outwardly towards the circumferential cutting line.

13. Apparatus according to claim 12 wherein the reflecting device is a conical mirror and the laser beam is directed at the tip of the cone.

14. Apparatus according to claim 12 wherein the optical system includes means for directing an annular laser beam towards the reflecting device.

15. Apparatus according to claim 12 wherein the reflecting device comprises a mirror located with a tubuler casing acting as a mirror holder, the mirror being inclined to a longitudinal axis of the casing and at least part of the casing adjacent the mirror being transparent to the laser beam; whereby the casing may be inserted axially within the tube to be cut and rotated when the laser beam is directed axially along the casing onto the mirror so that the refected beam scans around an internal surface of the tube.

16. Apparatus according to claim 15 wherein the casing is provided with an aperture adjacent the mirror for transmitting the reflected laser beam towards the internal surface of the tube.

17. Apparatus according to claim 15 wherein the casing is axially movable so as to be inserted or withdrawn from a tube to be cut.

18. Apparatus according to claim 7 wherein the optical system includes a reflecting device arranged to cause the laser beam to converge.

* * * * *